United States Patent [19]
Bloomquist et al.

[11] Patent Number: 5,441,788
[45] Date of Patent: Aug. 15, 1995

[54] METHOD OF PREPARING RECORDING MEDIA FOR A DISK DRIVE AND DISK DRIVE RECORDING MEDIA

[75] Inventors: Darrel R. Bloomquist, Meridian; Stephan P. Howe, Boise, both of Id.; Arun K. Agarwal, Corvallis, Oreg.

[73] Assignee: Hewlett-Packard Company, Palo Alto, Calif.

[21] Appl. No.: 148,136

[22] Filed: Nov. 3, 1993

[51] Int. Cl.⁶ .............. B32B 3/02; B32B 3/10; G11B 5/66

[52] U.S. Cl. .............. 428/65.6; 428/141; 428/336; 428/409; 428/611; 428/650; 428/651; 428/652; 428/654; 428/660; 428/667; 428/666; 428/694 T; 428/694 TS; 428/694 TR; 428/694 SG; 428/900

[58] Field of Search ...... 428/694 T, 694 TS, 694 TR, 428/900, 64, 65, 141, 336, 409, 611, 650, 651, 652, 654, 660, 666, 667, 694 SG

[56] References Cited

U.S. PATENT DOCUMENTS

| | | | |
|---|---|---|---|
| 4,610,911 | 9/1980 | Opfer | 428/213 |
| 4,939,045 | 7/1990 | Yoshida | 428/664 |
| 5,063,120 | 11/1991 | Edmonson | 428/694 |
| 5,122,423 | 6/1992 | Hase | 428/694 |
| 5,162,158 | 11/1992 | Christner | 428/611 |
| 5,202,810 | 4/1993 | Nakamura | 360/135 |
| 5,268,207 | 12/1993 | Kruger | 427/560 |
| 5,314,745 | 5/1994 | Okumura | 428/336 |
| 5,316,844 | 5/1994 | Suzuki | 428/323 |

*Primary Examiner*—L. Kiliman

[57] ABSTRACT

A magnetic recording disk has a layered structure comprising a metal substrate, a layer of NiP atop the metal substrate, the NiP layer having a surface roughness of less than 2.0 nanometers RMS, a metal layer over the polished NiP layer, the metal layer having a desired textured outer surface as a result of the sputter deposition, the textured outer surface being characterized by a cobblestone-like metallic grain structure with between 10 and 100 grains per square micron, an RMS surface roughness of between 1.0 and 8.0 nanometers, and with peak heights as measured from the mean plane of the surface over a 10 micron square area of between 2.0 and 20.0 nanometers, a magnetic layer atop the metal layer.

7 Claims, 2 Drawing Sheets

METHOD OF PREPARING RECORDING MEDIA FOR A DISK DRIVE AND DISK DRIVE RECORDING MEDIA

TECHNICAL FIELD

This invention relates to reduction of static and dynamic friction while achieving low flying height between a recording head and spinning recording media in hard disk drives.

BACKGROUND OF THE INVENTION

Hard disks are typically made from polished metal substrates, or platters, such as NiP plated aluminum. After polishing, the substrate is coated with various thin layers of materials which include magnetic material, and are then used either singly or in stacks within a disk-drive housing.

Hard disks utilize read/write heads to transfer data to and from the disk according to well-known principles of magnetic recording. Unlike floppy disk drives, hard disk read/write heads are not in contact with the disk-drive surface. Rather, they "fly" or are supported a few millionths of an inch from the disk's surface on a thin layer of air produced by the rapidly spinning disk.

The mechanical interface between the head and recording media in disk drives is viewed by many as one of the most challenging aspects of magnetic recording technology. The amount of information that can be packed onto a disk is determined in part by the spacing between the read/write transducer and disk. A closer spacing produces sharper transitions, allowing the data transitions to be recorded much closer together. Accordingly, there is a continuing effort to reduce the spacing between the read/write head and disk, yet still maintain physical separation between the head and media. Such small spacing between the disk and head implies the desirability of a very smooth disk surface having excellent flatness. Accordingly, the texture of the recording media surface is one component which plays an important role in reliably achieving reduced head/disk spacings.

The close spacing between a head and disk results in both kinetic and static friction. Although when spinning the head and disk are separated by a layer of air, during spin down the proximity of the two relative to one another results in kinetic friction. Static friction, commonly referred to as "stiction", occurs when the disk is not rotating and the head contacts the uppermost peaks of the disk's surface at rest. Static friction is measured during a repeated series of contact start stop (CSS) tests to determine disk reliability and expected life. While low flying height is highly desirable and maximized by providing maximum smoothness, extremely smooth surfaces place more material of the disk surface in contact with the head when the disk is not rotating, thus greatly increasing static friction.

Static friction generally increases with increased humidity. Static friction also increases as the head and disk stationary contact time increases. These effects are particularly severe after the disk has experienced contact start-stop wear.

Table 1 summarizes the average static friction measured for various humidity and stationary contact times after 2000 contact start-stop (CSS) cycles of wear for a typical prior art disk. Measurements were made using a standard 75% thin film slider with about 5 grams loading force.

TABLE 1

| Static Friction Summary for Prior Art Disk | | | | |
|---|---|---|---|---|
| Number of CSS cycles | 2000 | 2000 | 2000 | 2000 |
| Relative Humidity (%) | 20 | 80 | 80 | 80 |
| Stationary Contact Time (minutes) (before static friction measurement) | 0 | 0 | 60 | 600 |
| Mean Static Friction (Newtons) | 0.030 | 0.079 | 0.157 | 0.189 |

As is apparent, the static friction coefficient for a typical prior art disk increases drastically at high humidity with long stationary contact times. In order to provide a reliable disk drive, low static friction is required under these conditions. It would be desirable to reduce this static friction while at the same time enabling a low flying height.

In evaluating potentially new and production-capable disk drive designs, such disks are subjected to a series of tests which include a glide test and an electrical defect test. To pass a glide test, the slider housing the read/write head must not hit any bump or other surface attribute of the media for a given flying height. The electrical defect test then provides a plethora of read/write cycles for that flying height, and determines the number of defects which occur over the entirety of a given disk surface.

It is desirable to develop hard disk drives and methods for producing such drives which minimize stiction, allow reduced flying height while producing acceptable yield in a glide test, and which minimize defects in the electrical defect test.

BRIEF DESCRIPTION OF THE DRAWINGS

Preferred embodiments of the invention are described below with reference to the following accompanying drawings.

DETAILED DESCRIPTION OF THE INVENTION

This disclosure of the invention is submitted in furtherance of the constitutional purposes of the U.S. Patent Laws "to promote the progress of science and useful arts" (Article 1, Section 8).

In accordance with an aspect of the invention, a method of providing a textured surface for recording media for a disk drive comprises the following sequential steps:
  providing a metal substrate;
  providing a layer of NiP atop the metal substrate, the NiP layer having a surface roughness of greater than 2.0 nanometers root mean square (RMS);
  polishing the NiP layer to a surface roughness of less than 2.0 nanometers RMS; and
  sputter depositing a metal layer over the polished NiP layer without any intervening exposure of the NiP layer to texturing conditions after polishing of the NiP layer, the sputter deposited metal layer having a desired textured outer surface from a mean plane as a result of the sputter deposition, the textured outer surface being characterized by a cobblestone-like metallic grain structure with between 10 and 100 grains per square micron, an RMS surface roughness of between 1.0 and 8.0 nanometers, and with peak heights as measured from the mean plane of the surface over a 10 micron square area of between 2.0 and 20.0 nanometers.

In accordance with another aspect of the invention, a recording disk comprises:

a metal substrate base;

a layer of NiP contacting and overlying the metal substrate, the NiP layer including an outer surface having a roughness which is less than 2.0 nanometers RMS;

a sputter deposited metal layer contacting and overlying the NiP layer outer surface, the sputter deposited metal layer including a desired textured outer surface from a mean plane as a result of the sputter deposition, the textured outer surface being characterized by a metallic grain structure with between 10 and 100 grains per square micron, an RMS surface roughness of between 1.0 and 8.0 nanometers, and with peak heights as measured from the mean plane of the surface over a 10 micron square area of between 2.0 and 20.0 nanometers; and a magnetic recording media layer provided atop the sputter deposited metal layer.

Figure 1:
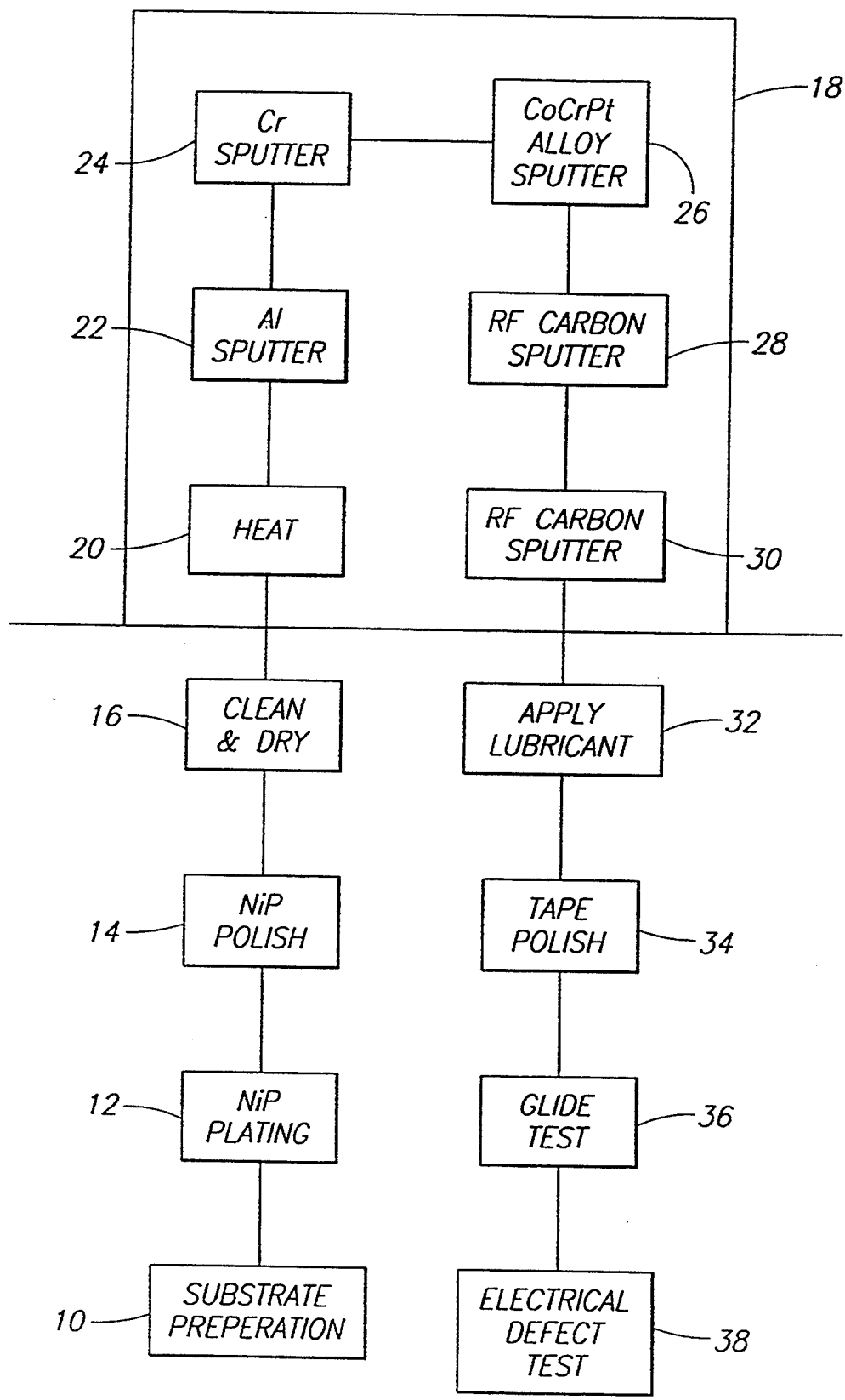
FIG. 1 represents a process flow for manufacturing a recording disk in accordance with the invention.

An example process in accordance with the invention is described with reference to the diagram of FIG. 1. Specifically, a metal substrate, such as aluminum, for formation of a hard disk is provided and prepared by polishing or other technique to have a suitable outer texture in accordance with the prior art, as represented by block 10. Thereafter, a layer of NiP is provided atop the metal substrate by electroless nickel plating, and will typically have a surface roughness of greater than 2.0 nanometers RMS, and even more typically greater than 100 nanometers RMS as deposited. Such is represented by block 12.

Next, the NiP layer is polished to provide a smoother surface roughness of less than 2.0 nanometers RMS average, as represented by block 14. In accordance with prior art processes and not that of the invention, a NiP layer after polishing would then be subjected to a texturizing or roughening step prior to cleaning and subsequent metal layer deposition as the technique for later providing a suitable outer texture roughness or finish. Referring back to FIG. 2, the disk with polished NiP layer is subjected to cleaning and drying steps in an effort to assure removal of any particles remaining on the surface at the conclusion of polishing.

A preferred technique includes a dip in an etching bath containing Actane and hydrogen peroxide ($H_2O_2$). Actane contains phosphoric acid ($H_3PO_4$) and can be purchased in liquid form from the Enthone company of New Haven, Conn. An example cleaning solution would be an aqueous solution of Actane and $H_2O_2$, with Actane at a concentration of 0.3% by volume and $H_2O_2$ at a concentration of 5% by volume. An example treatment of a disk in such a solution would be to provide a temperature of 40° C. for a time period of 7 minutes, with ultrasonic energy being provided to the solution for 7 minutes. This would be followed by rinsing in deionized water and drying, as is collectively represented in block 16. This would be followed by drying, as is collectively represented by block 16.

The treated disk would then be subjected to various sputtering deposition steps, for example in a Varian MDP 1100 TM sputtering system, as represented by enclosure 18. For example, the disk being treated would be subjected to a rapid heating by an infrared heater 20, and then transferred to a sputter chamber 22 for sputter deposition of a metal layer, such as aluminum. Accordingly in the above described manner in accordance with a preferred embodiment, a metal layer is sputter deposited over the polished NiP layer without any intervening exposure of the NiP layer to appreciable texturing conditions after polishing of the NiP layer which produced the NiP layer surface roughness of less than 2.0 nanometers RMS. Such a process produces a sputter deposited metal layer having a desired texture outer surface as a result of the sputter deposition. This provides a considerable improvement to the above-described example prior art process which further textures the NiP layer by subsequent polishing or other technique after an initial smoothing polish of the NiP layer after its deposition.

The textured outer surface of the sputter deposited metal layer in accordance with the invention will be characterized by a cobblestone-like metallic grain structure with between 10 and 100 grains per square micron, an RMS surface roughness of between 1.0 and 8.0 nanometers, and with peak heights as measured from the mean plane of the surface over a 10 micron square area of between 2.0 and 20.0 nanometers. Most preferred is 20–50 grains per square micron, an RMS surface roughness of between 1.0 and 3.0 nanometers, and peak heights of from 3.0 to 10.0 nanometers. The metal layer will preferably either consist essentially of elemental aluminum, consist essentially of an aluminum alloy, or comprise aluminum. Other metals, however, are expected to be usable in accordance with the invention.

The preferred disk temperature provided by heating step 20 is from about 180° C. to about 270° C., with from 200° C. to about 250° C. being most preferred. A preferred deposited average thickness of the metal layer is about 500 Angstroms. A preferred pressure range for the sputtering is from about 3 mTorr to about 20 mTorr.

The produced disk would then be processed further in sputter system 18 by providing a magnetic recording media layer atop the sputter deposited metal. Such is illustrated by the combination of conventional chromium sputtering and cobalt-chromium-platinum sputtering represented by blocks 24 and 26. Wear layers of carbon would be sputter deposited as illustrated by steps 28 and 30.

Thereafter, the disk would leave sputtering system 18 and an appropriate lubricant applied at a step 32. The processed disk would be subjected to a tape polish 34 to remove asperities, and then analyzed in a glide test 36 and an electrical defect test 38.

The invention was reduced to practice using an aluminum substrate and an elemental aluminum sputter deposited layer. Best results were obtained in an aluminum layer deposited to a thickness of approximately 500 Angstroms and at sputter deposit temperature of from 200° C. to 250° C. Such disks were compared for determinations of static friction, glide test and electrical defect test for a given flying height and slider against a control group of conventional prior art disks which were subjected to NiP roughening processes after NiP deposition and prior to sputter depositing.

Figure 2:
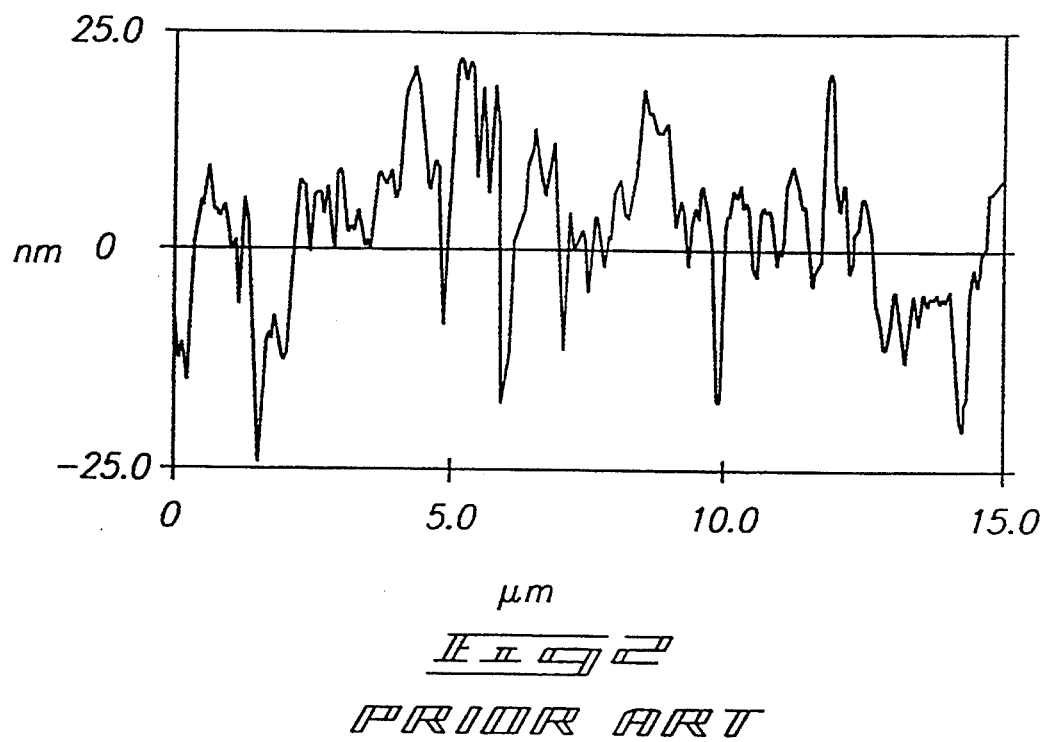
FIG. 2 is a radial line scan representation of the actual surface of a hard recording disk processed in accordance with prior art methods and constructions.
Figure 3:
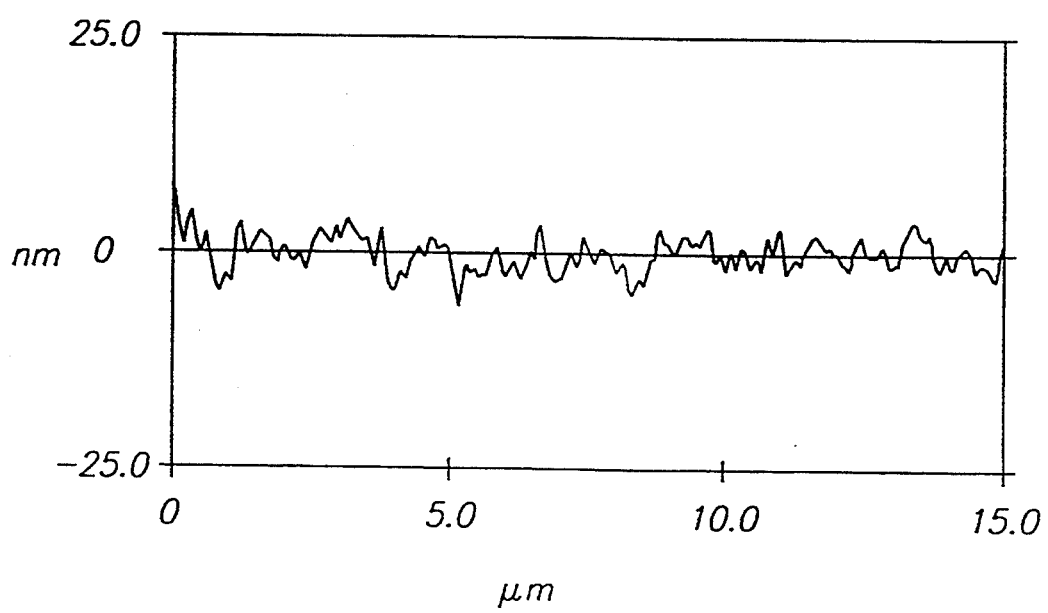
FIG. 3 is a radial line scan representation of the actual surface of a hard recording disk processed in accordance with methods and constructions of the invention.

FIG. 2 is a radial scan of an actual recording disk surface typical of the prior art. FIG. 3 is a radial scan of the upper surface of the sputter deposited aluminum layer of a recording disk processed in accordance with the above inventive process.

Table 2 below summarizes the average static friction measured for various humidity and stationary contact times after 2000 contact start-stop cycles of wear for recording disks in accordance with the invention. As is apparent, the static friction remains low, even at the extreme of high humidity and long stationary contact time.

TABLE 2

| Static Friction Summary for Disks According to Invention | | | | |
| --- | --- | --- | --- | --- |
| Number of CSS cycles | 2000 | 2000 | 2000 | 2000 |
| Relative Humidity (%) | 20 | 80 | 80 | 80 |
| Stationary Contact Time (minutes) (before static friction measurement) | 0 | 0 | 60 | 600 |
| Mean Static Friction (Newtons) | 0.030 | 0.040 | 0.049 | 0.054 |

It was further discovered in a comparison with the control group that disks processed in accordance with the invention provided a near 100% yield when subjected to the glide tests for a 4 microinch separation distance between head and media. Yield for the control group was considerably worse at around 50% for the same separation. The acceptable disks were then subjected to an electrical defect test. Disks processed in accordance with the invention had three or less errors per disk surface, while the control group experienced defects per surface of greater than 3 average.

The invention contemplates a disk produced according to the above process. Further, the invention contemplates a disk having the same attributes which might be fabricated by alternate processes.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A recording disk comprising:
    a metal substrate base;
    a layer of NiP contacting and overlying the metal substrate, the NiP layer including an outer surface having a roughness which is less than 2.0 nanometers RMS;
    a texture enhancing sputter deposited first metal layer contacting and overlying the NiP layer outer surface, the texture enhancing sputter deposited first metal layer including a desired textured outer surface from a mean plane as a result of the sputter deposition, the textured outer surface being characterized by a metallic grain structure with between 10 and 100 grains per square micron, an RMS surface roughness of between 1.0 and 8.0 nanometers, and with peak heights as measured from the mean plane of the surface over a 10 micron square area of between 2.0 and 20.0 nanometers;
    a second metal layer atop the texture enhancing sputter deposited first metal layer; and
    a magnetic recording media layer provided atop the second metal layer.

2. The recording disk of claim 1 wherein the base metal substrate comprises aluminum.

3. The recording disk of claim 1 wherein the first metal layer consists essentially of elemental aluminum.

4. The recording disk of claim 1 wherein the first metal layer consists essentially of an aluminum alloy.

5. The recording disk of claim 1 wherein the base metal substrate comprises aluminum, and the first metal layer comprises aluminum.

6. The recording disk of claim 1 wherein the first metal layer has a thickness of about 500 Angstroms.

7. The recording disk of claim 1 wherein the base metal substrate comprises aluminum, the first metal layer comprises aluminum, and the first metal layer has a thickness of about 500 Angstroms.

* * * * *